(12) United States Patent
Mourrier et al.

(10) Patent No.: US 10,992,123 B2
(45) Date of Patent: Apr. 27, 2021

(54) PROTECTED IDLE MODE BYPASSING POWER STAGE

(71) Applicant: Infineon Technologies AG, Neubiberg (DE)

(72) Inventors: Andre Mourrier, Manosque (FR); Kevin Thevenet, Cheval-Blanc (FR)

(73) Assignee: Infineon Technologies AG, Neubiberg (DE)

( * ) Notice: Subject to any disclaimer, the term of this patent is extended or adjusted under 35 U.S.C. 154(b) by 351 days.

(21) Appl. No.: 16/007,316

(22) Filed: Jun. 13, 2018

(65) Prior Publication Data
US 2019/0386480 A1 Dec. 19, 2019

(51) Int. Cl.
H02H 3/08 (2006.01)
H02H 3/02 (2006.01)
H02H 1/00 (2006.01)

(52) U.S. Cl.
CPC ............. *H02H 3/08* (2013.01); *H02H 3/025* (2013.01); *H02H 1/0007* (2013.01)

(58) Field of Classification Search
CPC .......... H02H 3/025; H02H 3/08; H02H 3/087; H02H 3/58; H02H 3/92; H02H 3/106; H02H 1/0007; H02H 9/026; H02H 9/02; H03K 17/0822

USPC ........................................................ 361/87
See application file for complete search history.

(56) References Cited

U.S. PATENT DOCUMENTS

| 3,493,791 | A | * | 2/1970 | Adelson | ............... | H03K 17/962 |
| | | | | | | 327/450 |
| 5,739,712 | A | * | 4/1998 | Fujii | ...................... | H03F 1/523 |
| | | | | | | 327/103 |
| 7,164,320 | B2 | * | 1/2007 | Felder | ..................... | G05F 1/573 |
| | | | | | | 330/298 |
| 10,027,223 | B1 | * | 7/2018 | Zhang | ..................... | H02M 3/07 |
| 10,536,077 | B2 | * | 1/2020 | Kakuno | ................ | H02M 3/157 |
| 2017/0331282 | A1 | * | 11/2017 | Wilson | ................. | H02H 1/0007 |
| 2018/0299499 | A1 | * | 10/2018 | Seidler | ................ | H02H 1/0076 |
| 2020/0182965 | A1 | * | 6/2020 | Herring | .................. | G01R 19/10 |

* cited by examiner

*Primary Examiner* — Yemane Mehari
(74) *Attorney, Agent, or Firm* — Murphy, Bilak & Homiller, PLLC (57) ABSTRACT

Circuits, systems and methods are provided wherein a bypass circuit provides an auxiliary current path to supply current from a power supply line to an electrical load. The bypass circuit is used during a low-power mode, and consumes less quiescent power than a main current path that provides current from the power supply line to the electrical load during normal operation. The bypass circuit includes a current limiter and a comparator, and generates a high-current detection signal responsive to the comparator detecting that a current through the current limiter exceeds a maximum allowed or expected current.

20 Claims, 6 Drawing Sheets

PROTECTED IDLE MODE BYPASSING POWER STAGE

TECHNICAL FIELD

The present application relates to a bypass circuit which provides a low-current power connection for powering a load when a main (higher-current) path is disabled, and that protects the load from short-circuit or other anomalous high-current conditions.

BACKGROUND

Automotive electrical systems continue to grow in size and complexity as vehicles increasingly depend on these systems. This is due, in part, to electrical requirements from modern safety, security, and convenience features such as traction control, anti-lock braking, navigation systems, power windows, and seat heaters. The transition to electric or hybrid electric/gas powertrains introduces a variety of new electrical requirements, as features previously dependent upon the always-available mechanical energy or vacuum of a gas engine, such as power-assisted steering, power-assisted braking, heating, and air conditioning, must be transitioned to be provided by electrical means. The electrically-powered versions of many of these features consume relatively high power levels. For example, an electric air conditioner compressor must be driven by an electric motor, and electric heating is typically provided by heating elements; such electric motors and heating elements have high power requirements. Furthermore, an electric or hybrid powertrain itself includes a variety of high-power components. The development of self-driving vehicles introduces yet additional and varied electrical requirements, including the requirements of both high and low-power sensors.

Mechanical relays have conventionally been used to provide and switch current to high-power systems within a car. Such relays are used, for example, in powering headlights, air conditioning clutch actuation, heated seats, and horns. Mechanical relays have the disadvantages that they consume relatively high power levels, they degrade over time as their contacts wear, and, related, they have a limited lifespan that is often shorter than the expected lifespan of the vehicle in which they are installed.

Circuitry and techniques that can provide high power levels for active high-power electrical systems, that can provide low power levels for electrical systems operating in low-power modes, and that can detect overcurrent conditions in such low-power modes are desired.

SUMMARY

According to an embodiment of a bypass circuit, the bypass circuit comprises a current limiter and a comparator. The current limiter is configured to provide an auxiliary current path between a power supply line and an electrical load when a main current path between the electrical load and the power supply line is disabled. The current limiter provides power to the electrical load during a low-power mode. The auxiliary current path is configured to support a lower current than the main current path. The current limiter may be enabled responsive to reception of an enable signal at an enable input. The enable signal is typically provided when the main current path is disabled. The comparator detects fault or other high-current conditions. The comparator is configured to compare a voltage drop across the current limiter with a reference voltage, and to output a detection signal responsive to the voltage drop exceeding the reference voltage. The detection signal may be used by a controller or other circuitry coupled to the bypass circuit to disable the current limiter and/or take other corrective action.

According to an embodiment of an electronic system, the electronic system includes an electrical load, a main current path, and a bypass circuit. The main current path is coupled between the electrical load and a power supply line and is configured to provide current to the electrical load during normal operational modes of the system. During a low-power mode, the main current path is disabled such that it does not supply current to the electrical load. The bypass circuit includes a current limiter and a comparator, which are configured as described above. During the low-power mode of the electronic system, the bypass circuit couples the power supply line to the electrical load, and outputs a detection signal responsive to detecting excessive current draw by the electrical load, as indicated by a voltage drop across the current limiter exceeding a reference voltage.

According to another embodiment, a method is provided for powering an electrical load that is coupled to a power supply line through a main current path. Current is provided to the electrical load through the main current path when the main current path is enabled, as may be indicated by the electrical load demanding power. An auxiliary current path is provided, via a current limiter, between the power supply line and the electrical load. The auxiliary current path is configured to support lower current than the main current path. The current limiter may be enabled during a low-power mode when the main current path is disabled. A voltage drop across the current limiter is compared to a reference voltage and, responsive to detecting that this voltage drop exceeds the reference voltage, a detection signal is generated.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments may be combined unless they exclude each other. Embodiments are depicted in the drawings and are detailed in the description that follows.

DETAILED DESCRIPTION

The embodiments described herein provide bypass circuits, electronic systems that make use of such bypass circuits, and methods for providing power to an electrical load using such bypass circuits. The embodiments are described in the context of automotive electrical systems, but the disclosed circuits and techniques may be used in other applications. In particular, the circuits and techniques are advantageously used in electrical systems requiring low quiescent current during low-power (standby) operational modes. Such electrical systems include, notably, portable or other battery-powered systems.

While mechanical relays have conventionally been used for providing current to electrical systems and subsystems that consume high levels of power, semiconductor advances are making the use of solid-state switches feasible and, in some applications, preferable to mechanical relays. This trend is expected to continue. Solid-state switches do not have contacts that wear with usage, as do mechanical relays, and have expected lifespans that are considerably longer than that of mechanical relays. The effective resistance of solid-state switches is often less than that of comparable mechanical relays, thereby leading to lower power losses through solid-state switches.

The use of solid-state switches to provide a high-current path from a power supply to a load provides the additional advantage that current through a solid-state switch may be sensed and used to detect and respond to an anomalously high current. A high-current path based upon solid-state switch(es) may, thus, also provide a protection function similar to that provided by a fuse.

Solid-state switches for providing a switchable high-current path may use a variety of transistors including power metal-oxide semiconductor field-effect transistors (MOSFETs), insulated-gate bipolar transistors (IGBTs), gallium nitride (GaN) transistors, silicon carbide (SiC) MOSFETs and power bipolar junction transistors (BJTs). To support the high current flow and low resistance requirements, a bank of power transistors, e.g., MOSFETs, may be configured in parallel, and/or a transistor having large channel width may be used.

A typical high-current path consumes some power when it is enabled. For example, current sensing circuitry, based upon operational amplifiers or other components, must be powered. During normal operational modes, the power consumed by the high-current path may be insignificant relative to the power consumption of the load being powered. However, the power consumed by the high-current path may represent a significant portion of the system power consumption when the load is in a low-power (standby) state. It is desirable to reduce or avoid the power consumption of the high-current path, particularly during low-power (standby) operational modes.

To avoid power losses associated with the high-current path, the solid-state switches and any associated circuitry may be turned off when the subsystems being powered are in a low-power state (e.g., standby). Even in such a low-power state, however, it is helpful to provide a small amount of power to the subsystems, e.g., to maintain the content of volatile memory, to monitor radio receivers for keyless entry, or to monitor sensors associated with a car alarm.

To address the above-described needs, a bypass circuit is described below. The bypass circuit is used to provide current (power) to electrical subsystems including, e.g., automotive electrical systems, when a main (high-power) current path is disabled. With the main current path disabled, there is no readily available protection against high-current conditions, including short circuits within the electrical subsystems (load) or similar faults. Hence, the bypass circuit includes a current limiter that limits the provided current to be below a low-current limit. If the current flow through the current limiter exceeds this a high-current detection signal (e.g., fault signal) is generated. The bypass circuit may use this detection signal to disable the current limiter, thereby removing current from the electrical subsystems (load). Alternatively, the detection signal may be provided to external circuitry, such as a controller, which may take an appropriate action. The appropriate action may be providing a signal to disable the current limiter and/or enabling the main current path.

The bypass circuit, with or without a controller, may effectively act as a fuse that protects an electrical system from short-circuits or similar faults. Unlike a fuse, the bypass circuit may recover from a high-current event without the need to replace any components. Transient fault conditions may thus be automatically addressed, e.g., by a controller without human intervention. For example, an anomalous latch-up condition in electronic circuitry within the electrical subsystem (load) may trigger the high-current detection, leading to a reset of the electrical subsystem which may cure the anomaly. For another example, a short-circuit caused by moisture creating a current path between two nodes may disappear over time, as the moisture evaporates. Again, this fault may be corrected without human intervention, e.g., the replacement of a physical fuse.

The bypass circuit described below relies upon a simple comparator to detect high-current conditions. The bypass circuit does not need to determine a highly accurate estimate of the current flowing through it, as may be required by the high-current path. A loose current estimate is adequate for purposes of detecting anomalously high current, e.g., as caused by a short circuit. The described bypass circuit provides a fast overload protection, and consumes little current, e.g., <50 µA, in doing so. This consumption is significantly less than the current consumption required to keep the high-current path enabled, which may require 10s of mA. The bypass circuit may be configured to supply current from a few µA to a few Amps, whereas the high-current path typically supplies 10s to 100s of Amps.

The embodiments are described below by way of several particular examples. It should be understood that the below examples are not meant to be limiting. Circuits and techniques that are well-known in the art are not described in detail, so as to avoid obscuring unique aspects of the invention. Features and aspects from the example embodiments may be combined or re-arranged, except where the context does not allow this.

Low-Power Bypass Circuit

Figure 1:
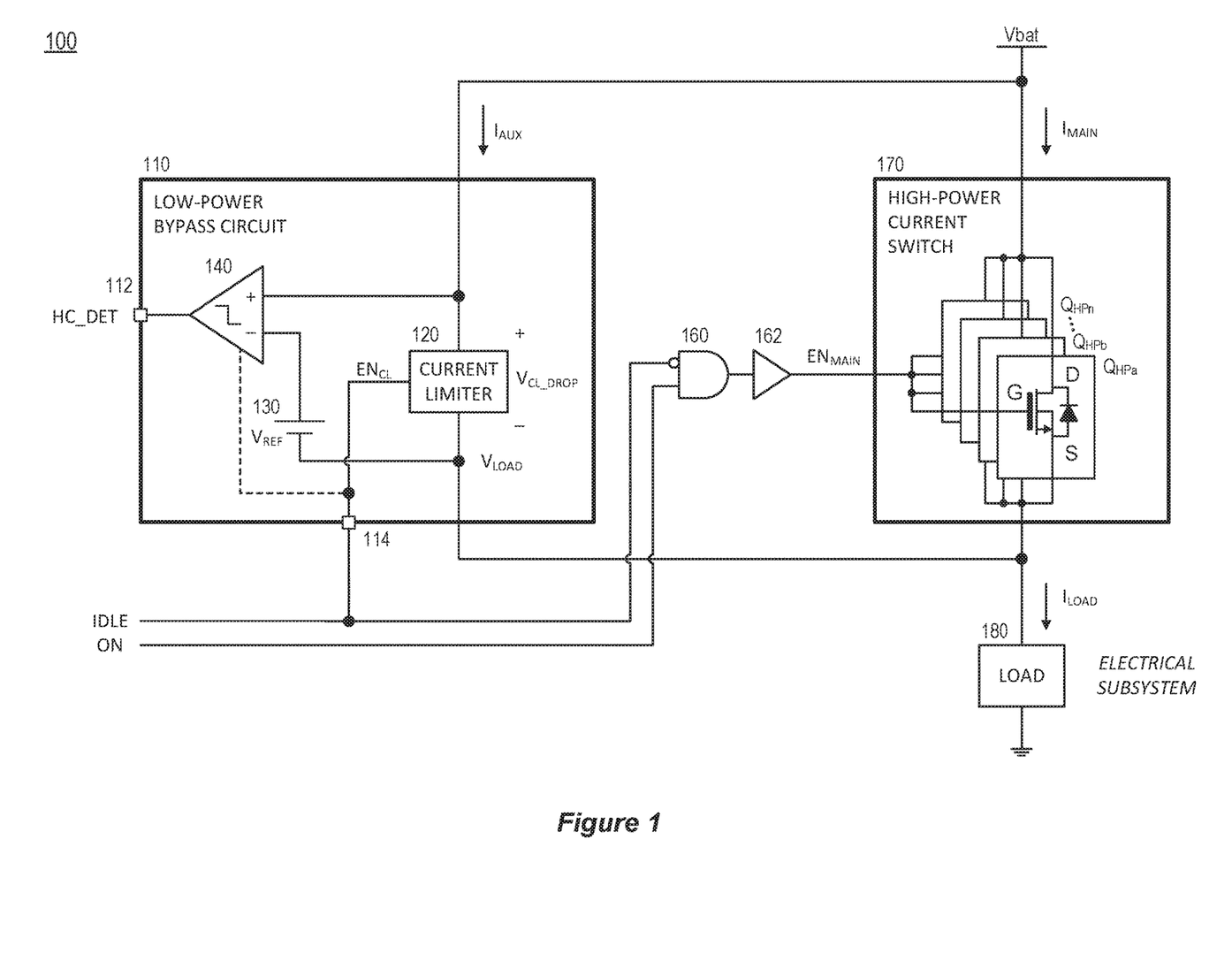
FIG. 1 illustrates a low-power bypass circuit for supplying current to a load when a main high-power current path is disabled.

FIG. 1 illustrates an embodiment of a low-power bypass circuit 110 within an electronic system 100. The electronic system 100 further includes a high-power current switch 170, a power supply line Vbat, and a load 180. The electronic system 100 may be part of an automotive electrical system, in which case the load 180 comprises an automotive electrical subsystem, as described above. A controller, which is not shown for ease of illustration, may manage the high-power current switch 170 and the low-power bypass switch 180, and may monitor the electronic system 100 for faults such as high-current (short circuit) conditions.

During normal operating conditions of the electronic system 100, e.g., when a vehicle is on, the ON signal is active and the IDLE signal is not active. An AND gate 160 together with a gate driver 162 provide an enable signal $EN_{MAIN}$ that turns on the high-power current switch 170. (Because logic gates and gate driver circuits are well-known in the art, they will not be described further.) As illustrated, the high-power current switch 170 includes a bank of power MOSFETs $Q_{HPa}$, $Q_{HPb}$, ... $Q_{HPn}$ connected in parallel such that their respective drain terminals are tied together, their respective source terminals are tied together, and their respective gate terminals are tied together. The high-power current switch 170 may be implemented in other ways, including the use of a single large power MOSFET, or other switch types.

With the high-power current switch 170 enabled, via the enable signal $EN_{MAIN}$, a current $I_{MAIN}$ provides power to the load 180 (electrical subsystem). This current $I_{MAIN}$ may be on the order of 10s or even 100s of Amps, and the current consumed by the high-power current switch 170, e.g., for powering protection circuits therein, is negligible relative to the current $I_{MAIN}$ provided to the load 180. However, the power consumed by the high-power current switch 170 may not represent a negligible portion of the overall power consumption when the load 180 is in a low-power state (e.g., IDLE).

When the load is not active, e.g., when a vehicle is turned off, it is still desirable to provide a low-level of power (current) to the load 180 for maintaining volatile memory, monitoring low-power sensors, etc. This is accomplished by deactivating the ON signal and activating the IDLE signal, which turns off, via deactivation of the enable signal $EN_{MAIN}$, the high-power current switch 170. Activation of the IDLE signal also enables the low-power bypass circuit 110, and a current limiter 120 therein. When activated, the low-power bypass circuit 110 provides an auxiliary current path between the power supply line Vbat and the load 180. The provided auxiliary current path is designed to support a lower current level than the main current path, and is also configured to detect abnormally large current flows during the IDLE mode of the electronic system 100. For example, the quiescent current draw of the load 180 may be expected to be less than 1 A during IDLE mode, and any current greater than this should be detected. (While an exemplary IDLE-mode current threshold is mentioned here, this threshold is typically adjustable as explained further below.) The low-pass bypass circuit 110 detects current levels above such an IDLE-mode current threshold, and is designed to incur minimal power loss in doing so.

The low-power bypass circuit 110 includes the current limiter 120, a reference voltage source 130, and a comparator 140. A current-limiter enable signal $EN_{CL}$, which is provided at an input terminal 114, enables the current limiter 120 such that an auxiliary current $I_{AUX}$ can flow from the power supply line Vbat to the load 180. The current limiter 120 limits this current using a shunt resistor, a switch, and/or similar current-limiting components. (Specific current limiter sub-embodiments are described below.) A voltage drop $V_{CL\_DROP}$ is induced across the current limiter 120, leading to a voltage $V_{LOAD} = Vbat - V_{CL\_DROP}$ that is provided to the load 180. The voltage source 130 provides a reference voltage $V_{REF}$ and is coupled between the current limiter output at the node $V_{LOAD}$ and an inverting input of the comparator 140, as illustrated. A noninverting input to the comparator 140 is coupled to the current limiter input, e.g., the power supply line Vbat. The comparator 140 is thus configured to compare the voltage drop $V_{CL\_DROP}$ against the reference voltage $V_{REF}$, and output a high-current detection signal HC_DET at an output terminal 112 responsive to the voltage drop $V_{CL\_DROP}$ exceeding the reference voltage $V_{REF}$. The comparator 140 outputs a binary signal typically corresponding to logic levels, e.g., 0V representing an inactive signal and 1.8, 3.3, 5.0, or 12 V representing the active high-current detection signal HC_DET. For ease of illustration, power supply connections, which determine the comparator's output levels, are not shown.

The comparator 140 does not need to be particularly fast or accurate, and can be designed to consume nearly no static power. This represents a significant advantage over more complex over-current protection circuits, including circuits that are based on full operational amplifiers, which consume non-negligible levels of quiescent current.

The high-current detection signal HC_DET may indicate abnormal current consumption in the load 180, e.g., as caused by a short circuit. Responsive to activation of the high-current detection signal HC_DET, a controller inputting this signal may disable the IDLE signal, thereby shutting off all current flow to the load 180, so as to address the potential fault situation and prevent further damage to the electronic system 100 and/or reduce the possibility of electrical fire. Alternatively, the controller may use the high-current detection HC_DET signal to indicate a change in the operating state of the load 180, and take other corrective action. Such techniques are described subsequently in relation to the embodiment illustrated in FIG. 3.

Note that the AND gate 160 may not be included in some embodiments. Furthermore, in some embodiments, the IDLE signal may be activated before the ON signal is deactivated, thereby providing a time interval during which both the low-power bypass circuit 110 and the high-power current switch 170 are enabled, via their respective enable signals $EN_{CL}$, $EN_{MAIN}$, so as to ensure an uninterrupted current $I_{LOAD}$ to the load 180. In yet further embodiments, the low-pass bypass circuit 110 and its current limiter 120 may be enabled even during normal operational mode, in which case the enable signal $EN_{CL}$ and its associated input 114 are not needed. For such an embodiment, the high-current detection signal HC_DET may be ignored during normal operational mode.

For still other embodiments, the current-limiter enable signal $EN_{CL}$ may also be provided to the comparator 140, so as to disable the comparator 140 when the low-power bypass circuit 110 is not active.

Figure 2A:
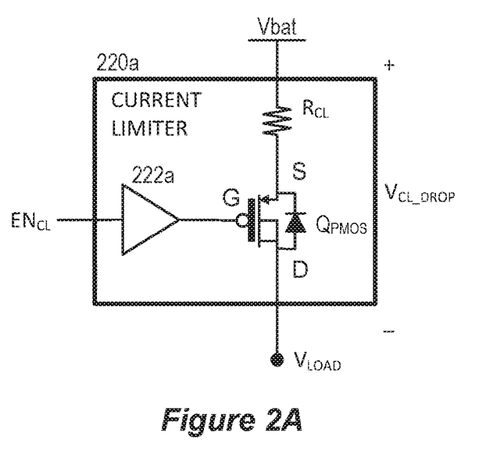
FIGS. 2A, 2B, 2C, and 2D illustrate current limiter circuits as may be used in the bypass circuit of FIG. 1.
Figure 2B:
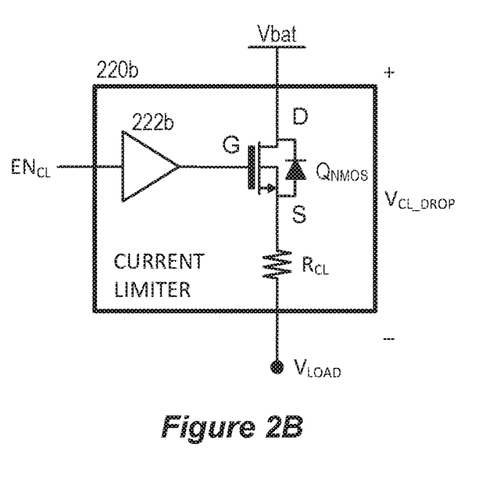

FIGS. 2A and 2B illustrate MOSFET-based current-limiter circuits 220a, 220b as could be used as the current limiter 120 of FIG. 1. The current-limiter circuit 220a of FIG. 2A includes a p-channel MOSFET $Q_{PMOS}$, a current-limiting resistor $R_{CL}$, and a driver 222a. The driver 222a sets a gate-to-source voltage $V_{GS}$ of the pMOSFET $Q_{PMOS}$ to an appropriate level, e.g., –6V, to turn on the pMOSFET $Q_{PMOS}$ when the current-limiter enable signal $EN_{CL}$ is active. With the pMOSFET $Q_{PMOS}$ turned on, an auxiliary current $I_{AUX}$ can flow through the current limiter 220a. The voltage drop $V_{CL\_DROP}$ across the current limiter 220a is determined from the drain-source voltage $V_{DS}$ of the PMOSFET $Q_{PMOS}$ and the resistor voltage $I_{AUX} \times R_{CL}$, wherein the resistive drop varies linearly with the current $I_{AUX}$.

The current-limiter circuit 220b of FIG. 2B is similar to the current-limiter circuit 220a of FIG. 2A, except that an n-channel MOSFET $Q_{NMOS}$ is used to switch the auxiliary current $I_{AUX}$. A driver 222b sets a gate-to-source voltage $V_{GS}$ of the nMOSFET $Q_{NMOS}$ to an appropriate level, e.g., 6V, to turn on the nMOSFET $Q_{NMOS}$ when the current-limiter enable signal $EN_{CL}$ is active. (Because transistor driver circuits are generally well-known in the art, they will not be further described herein.) The MOSFET-based current-limiter circuits 220a, 220b offer the advantage that nearly no static current is required to maintain the MOSFET switches in their active (on) states. However, other switch types may be preferred in some applications. Other power loss, e.g., the resistive loss $(I_{AUX})^2 \times R_{CL}$, is minimal provided only small quiescent current $I_{AUX}$ is being consumed by the load 180.

Figure 2C:
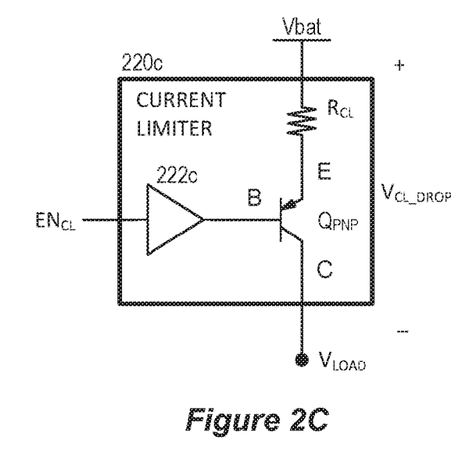
Figure 2D:
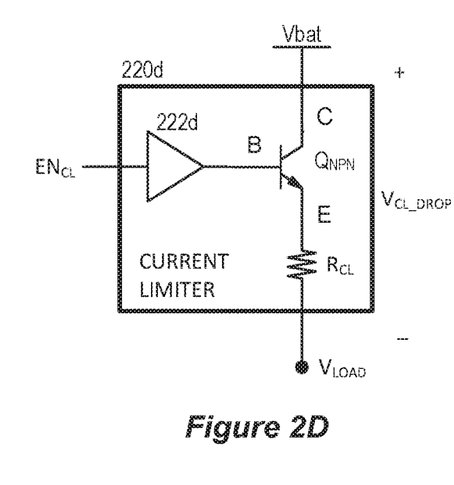

FIGS. 2C and 2D illustrate current-limiter circuits 220c, 220d based upon bipolar-junction transistors (BJTs). Such circuits could be used as the current limiter 120 of FIG. 1, rather than either of the MOSFET-based current limiters 220a, 220b described above. The current-limiter circuit 220c of FIG. 2C includes a pnp BJT $Q_{PNP}$, a current-limiting resistor $R_{CL}$, and a driver 222c. The driver 222c provides a control current to the base of the pnp BJT $Q_{PNP}$, so as to turn on the pnp BJT $Q_{PNP}$ when the current-limiter enable signal $EN_{CL}$ is active. With the pnp BJT $Q_{PNP}$ turned on, the auxiliary current $I_{AUX}$ flows through the current limiter 220c. The voltage drop $V_{CL\_DROP}$ across the current limiter 220c is determined from the collector-emitter voltage $V_{CE}$ of the pnp BJT $Q_{PNP}$ and the resistor voltage $I_{AUX} \times R_{CL}$.

The current-limiter circuit 220d of FIG. 2d is similar to the current-limiter circuit 220c of FIG. 20, except that an npn BJT $Q_{NPN}$ is used to switch the auxiliary current $I_{AUX}$. A driver 222d provides a control current to the base of the npn BJT $Q_{NPN}$, so as to turn on the pnp BJT $Q_{PNP}$ when the current-limiter enable signal $EN_{CL}$ is active.

Use of High Current Detection within an Electronic System

As described above, the low-pass bypass circuit 110 of FIG. 1 generates a high-current detection signal HC_DET during low-power operation of an electronic system 100, and a controller in the electronic system 100 may use this signal to take appropriate action. For example, the high-current condition may indicate a fault, in which case the power source Vbat should be removed from the load 180. In other cases, the high-current condition may indicate a change in state of the load 180, and actions other than removing power may be desired. These techniques are described using the circuit 300 of FIG. 3.

Figure 3:
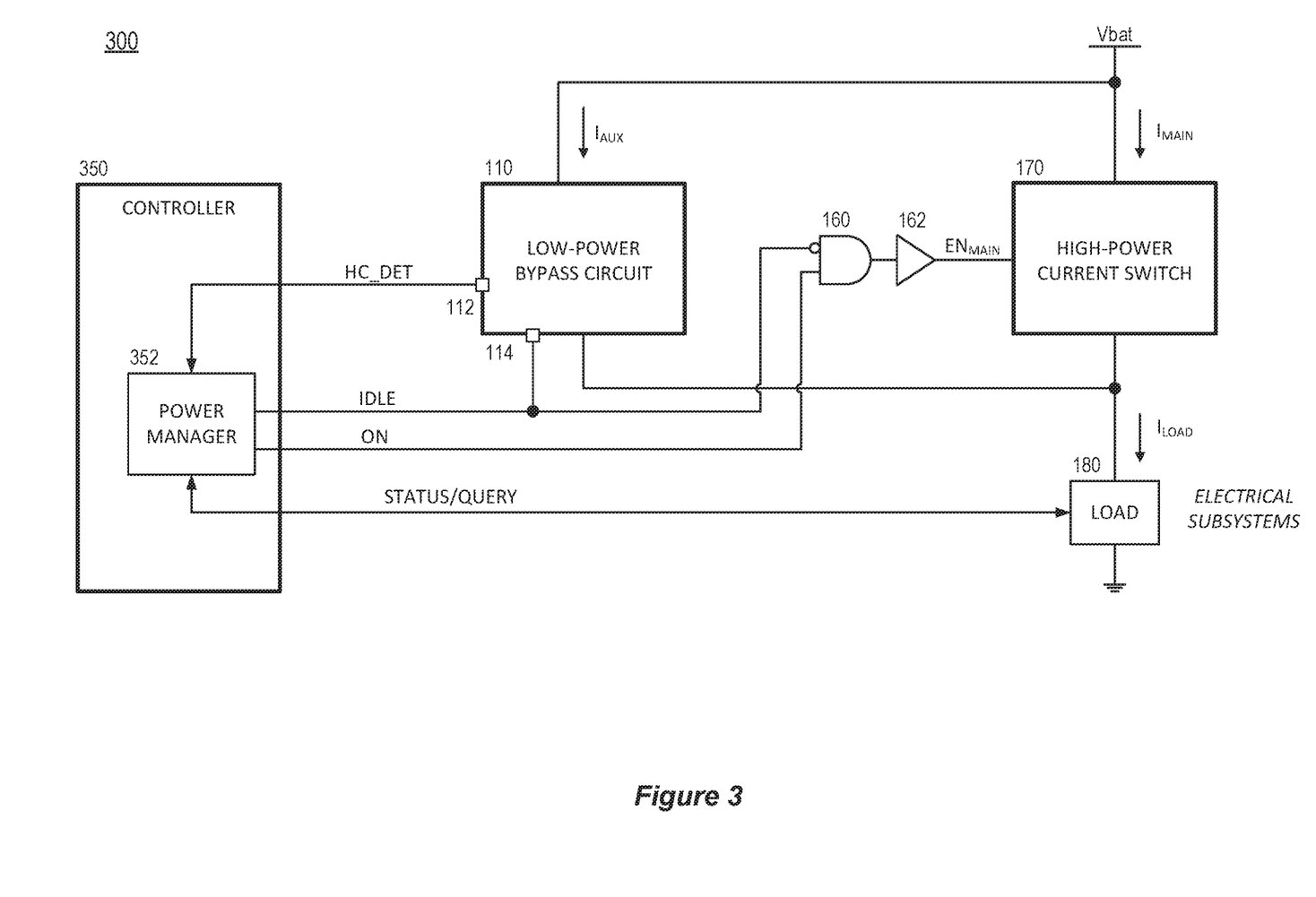
FIG. 3 illustrates a schematic diagram of an electronic system including a controller hat uses of the low-power bypass circuit for detecting high-current conditions.

FIG. 3 illustrates an electronic system 300 that is similar to that of FIG. 1, but additionally including a controller 350 and a power manager 352 therein. The power manager 352 is coupled, e.g., via a communication interface, to electrical subsystems of the load 180, and determines whether current should be supplied to the load 180 via the high-power current switch 170 or the low-power bypass circuit 110. The power manager 352 may make this determination based upon the state, e.g., active, standby, off, of components within the load 180. For example, the power manager 352 may enable the low-power bypass circuit 110 when a vehicle is switched off, so as to provide an auxiliary low-current path $I_{AUX}$ to the load 180 for maintaining volatile memory, monitoring sensors, etc.

In a first sub-embodiment, the power manager 352 treats an active high-current detection signal HC_DET as being indicative of a fault condition. For this sub-embodiment, the power manager 352 de-activates both the ON and IDLE signals, thereby removing power from the load 180, responsive to reception of the high-current detection signal HC_DET. The power manager 352 may communicate the fault condition to other circuits, so that the fault may be logged and/or so that the fault may be diagnosed.

In a second sub-embodiment, the power manager 352 does not immediately conclude that an active high-current detection signal (HC_DET) indicates a fault. Instead, the power manager 352 uses the high-current detection signal (HC_DET) to indicate a change in the power mode of the load 180. Hence, the power manager 352 enables the high-power current switch 170 responsive to an active high-current detection signal (HC_DET).

In a third sub-embodiment, the power manager 352 also does not immediately conclude that an active high-current detection signal (HC_DET) indicates a fault, but the controller uses other techniques to determine whether the high-current detection signal (HC_DET) was caused by a fault or by normal operation. The power manager 352 may query electrical subsystems of the load 180, e.g., using the illustrated STATUS/QUERY communication interface, to determine if there is a non-fault reason for the current drain to exceed the expected maximum current drain in the IDLE state. For example, a vehicle may attempt to unlock its doors and/or turn on its lights responsive to a radio signal from a keyless entry transmitter (fob), thereby triggering the high-current detection signal (HC_DET) even though the IDLE state has not yet been exited. If the power manager 352 determines that the load 180 is drawing high current for such an explainable (non-fault) reason during IDLE mode, the power manager 352 may enable the high-current switch 170, and disable the low-power bypass circuit 110 by activating the ON signal and deactivating the IDLE signal. In this way, the power manager 352 may use the low-power bypass circuit 110 to wake up the electronic system 300 based upon its current draw, rather than using more power-hungry techniques such as polling a status of the load 180 on a periodic basis.

If the power manager 352 does not detect a reason for the high current draw, then the power manager 352 may assume there is a fault condition and take appropriate action, as described in the first sub-embodiment.

In another sub-embodiment, the first and second sub-embodiments are combined. A variant of the illustrated low-power bypass circuit 110 may provide two high-current detection signals, one of which indicates a fault (e.g., short circuit) and the other indicates a moderately high-current condition that may be associated with normal operation.

Method for Powering an Electrical Load from Main and Auxiliary Current Paths

Figure 4:
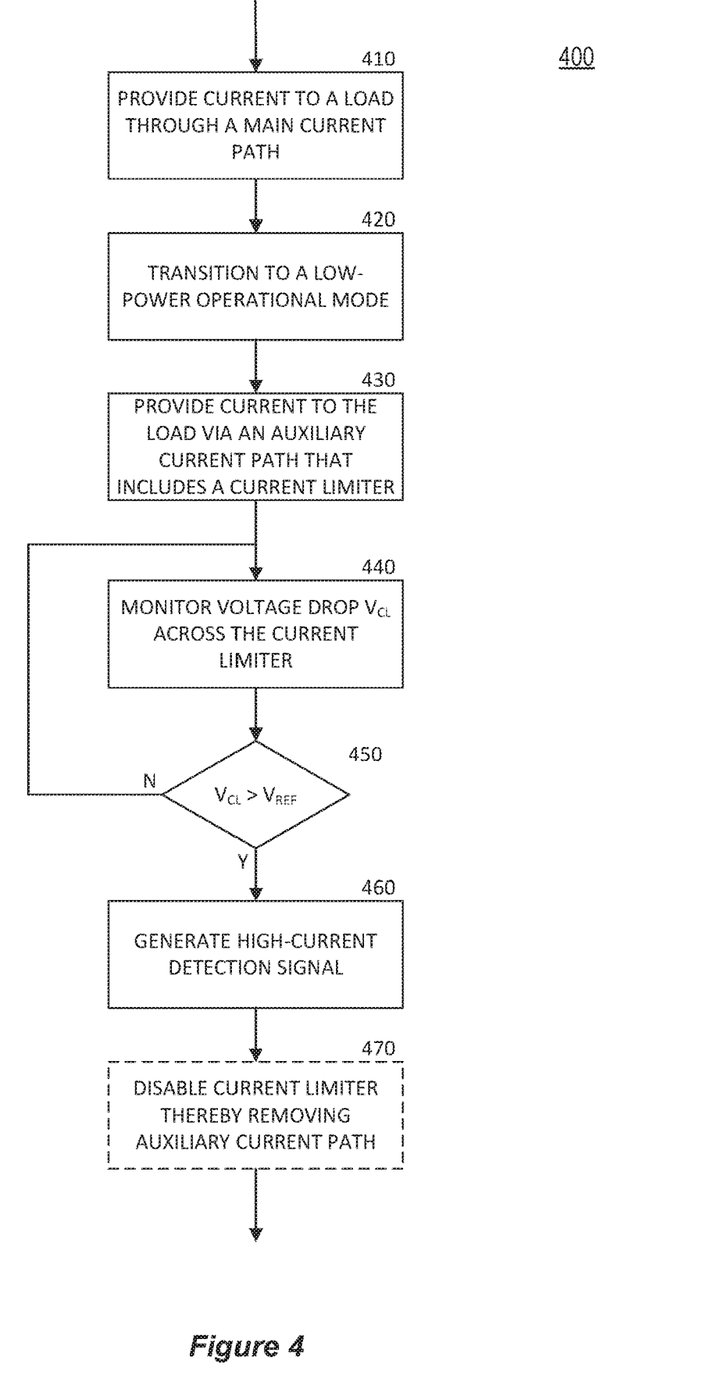
FIG. 4 illustrates a method for powering an electrical load via a main current path and an auxiliary current path.

FIG. 4 illustrates a method 400 for providing current to an electrical load from a power supply line. The method may be implemented within an electronic system which includes a low-pass bypass circuit, such as the electronic system 300 illustrated in FIG. 3.

The method 400 begins with providing 410 current to a load through a main current path. This typically occurs when the load is in a fully operational, e.g., ON, state. The main current path may comprise a high-power current switch such as the switch 170 illustrated in FIG. 3. A transition 420 is made to a low-power operational mode, e.g., the load may indicate that it no longer requires normal power levels and/or a controller may determine that a low-power (standby) mode should be entered. Current is then provided 430 to the load via an auxiliary current path, rather than via the main current path. The auxiliary current path includes a current limiter for limiting the level of current that is provided to the load during the low-power (standby) mode. A voltage $V_{CL}$ across the current limiter is monitored 440 and compared 450 against a reference voltage $V_{REF}$. Responsive to the current limiter voltage $V_{CL}$ exceeding the reference voltage $V_{REF}$, a high-current detection signal is generated 460. In some embodiments, the current limiter is disabled 470, thereby cutting off the auxiliary current path and removing all power flow to the load.

In some embodiments, which are not shown for ease of illustration, current flow to the load may be restored at some point after the disabling 470 of the current limiter. For example, after some delay, the high-current path may be re-enabled and the method 400 begins again. In another example, after some delay, the auxiliary current path may be re-enabled to provide 430 current to the load.

Figure 5:
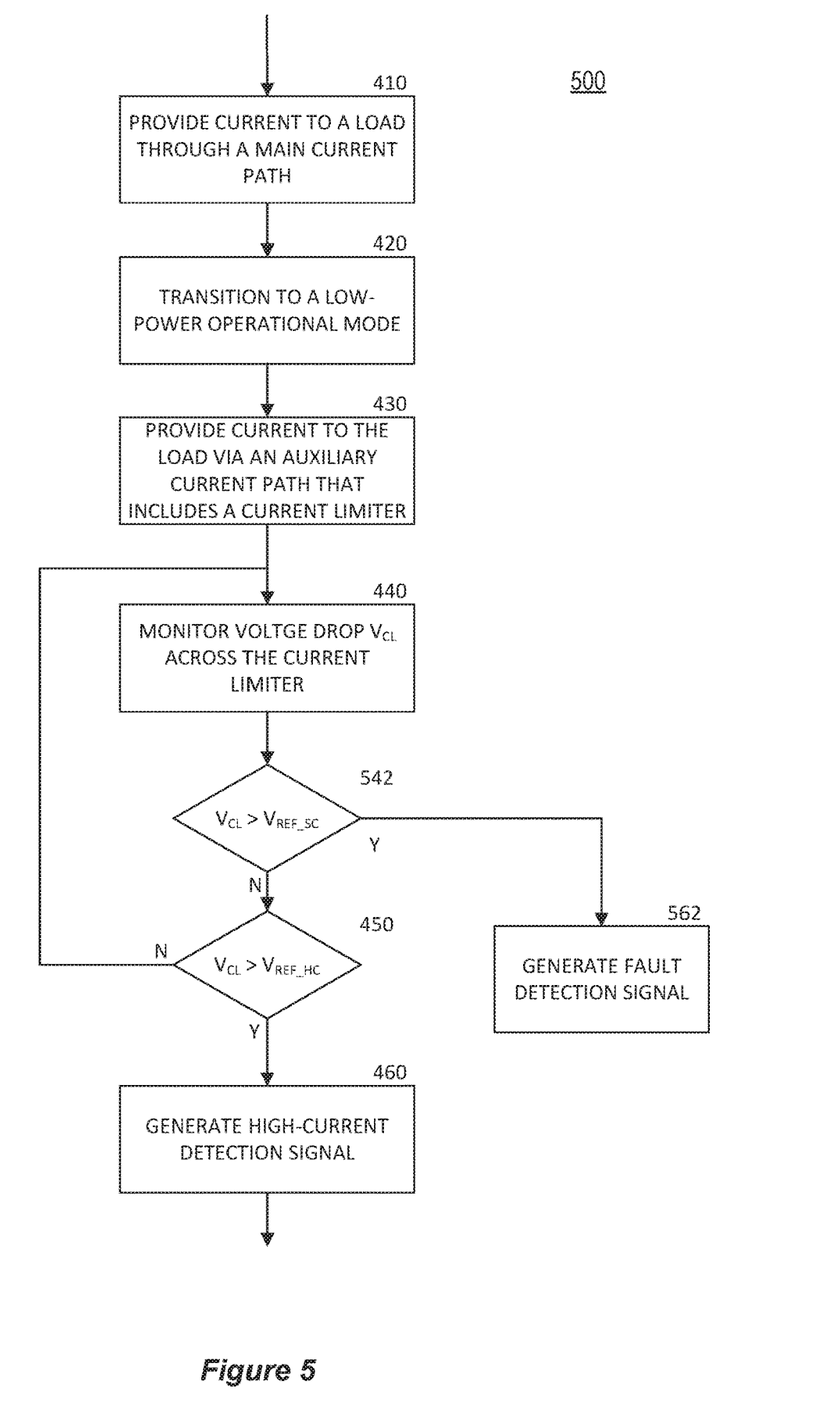
FIG. 5 illustrates an alternative method for powering an electrical load via a main current path and an auxiliary current path.

FIG. 5 illustrates an alternative method 500 for providing current to an electrical load from a power supply line. The method is similar to the method 400 of FIG. 4, and only differences between the methods 400 and 500 are described below.

When monitoring 440 the current-limiter voltage $V_{CL}$, the method 500 compares 542, 450 the voltage $V_{CL}$ against both a high-current reference voltage $V_{REF\_HC}$, and a short-circuit reference voltage $V_{REF\_SC}$. While illustrated as occurring in series, these comparisons 542, 450 preferably are performed continuously and simultaneously. The short-circuit reference voltage $V_{REF\_SC}$ indicates a fault condition, such as a short circuit, and a detection signal indicating this is generated 562 when the current-limiter voltage $V_{CL}$ exceeds this threshold. The high-current reference voltage $V_{REF\_HC}$ is lower than the short-circuit reference voltage $V_{REF\_SC}$, and may indicate a high-current condition that is not necessarily associated with a fault condition. The high-current detection signal generated 460 as a result of exceeding the high-current reference voltage $V_{REF\_HC}$ may indicate a condition that is recoverable for situations when the short-circuit reference voltage $V_{REF\_SC}$ is not exceeded.

Method for Controlling Low-Power Bypass Circuit

Figure 6:
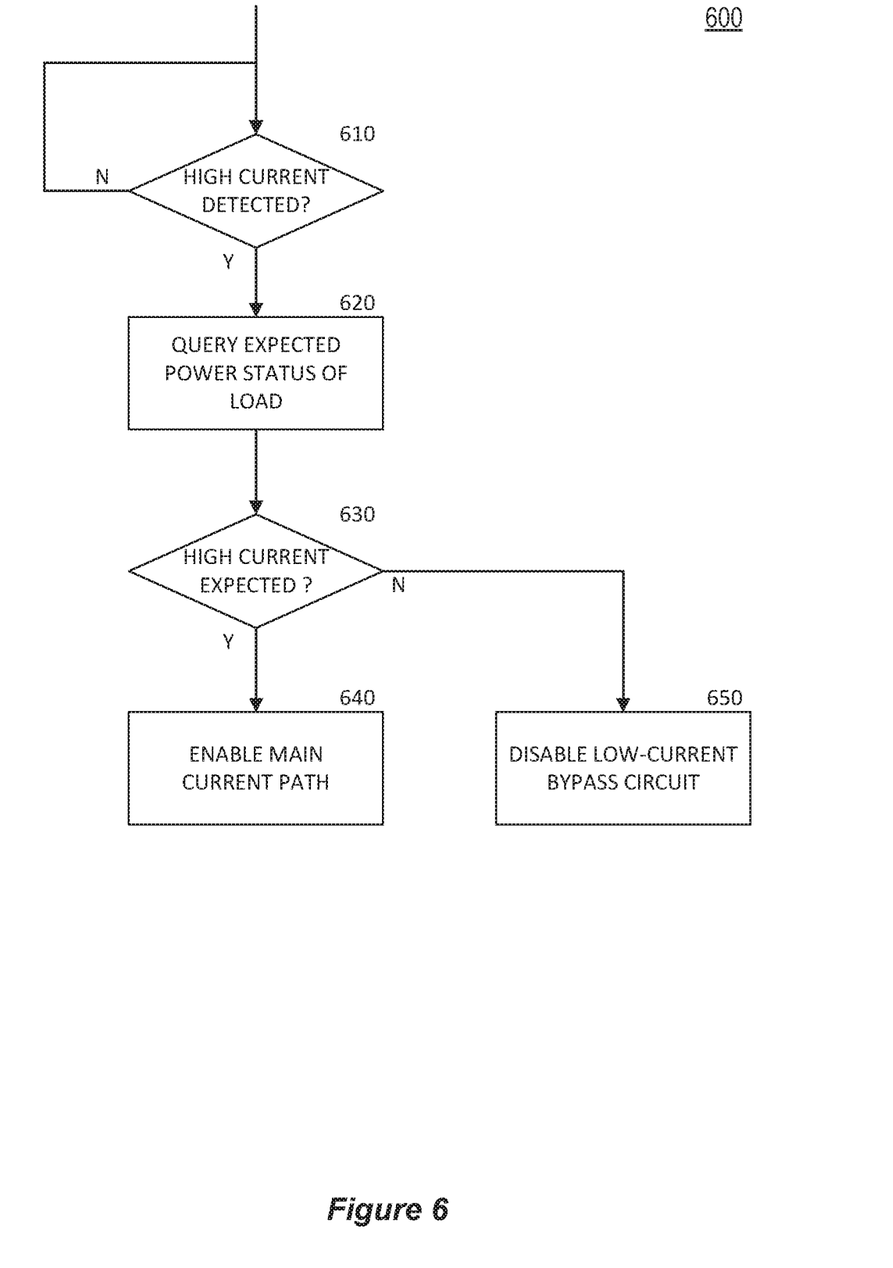
FIG. 6 illustrates a method for controlling a low-power bypass circuit and a high-power current switch.

FIG. 6 illustrates a method 600 for controlling a low-power bypass circuit and a high-power current switch, such as the circuits 110, 170 illustrated in FIG. 3. This method may be performed within a controller, such as the controller 350 of FIG. 3. Whereas the previously-described methods generate a high-current detection signal, as may indicate a fault, the method 600 inputs the high-current detection signal and then determines whether to switch to a normal (high-current) operational mode or to shut off power to a load, based on whether the high-current condition is associated with an expected power consumption.

In a first step, it is detected 610 that a high-current detection signal is activated. Responsive to this detection, the load is queried 620, e.g., by sending a status request message to the load. The load responds 630 with its status, which indicates whether its sub-systems are in a low-power (standby) mode, or if some circuits are active, thereby indicating that the high-current condition has an expected (non-fault) cause. Upon reception of a status message indicating that the high-current condition is expected, an enable signal (e.g., ON) is sent to a high-power current switch, so as to enable 640 a main current path to the load. In alternative sub-embodiments, a status of the electronic system may be checked without sending a status request message to a load. For example, a controller within the system may maintain a system status parameter. Upon detecting the high-current signal, the controller can query the system status parameter to determine if the high-current condition has an expected cause other than a fault condition. If the high-current condition is not expected, as indicated by the status message from the load or otherwise, the low-current bypass switch is disabled 650, thereby removing power from the load so as to address the suspected fault condition.

According to an embodiment of a bypass circuit, the bypass circuit comprises: a current limiter configured to provide an auxiliary current path between a power supply line and an electrical load if a main current path between the electrical load and the power supply line is disabled during a low-power mode, the auxiliary current path being configured to support a lower current than the main current path; and a comparator configured to compare a voltage drop across the current limiter to a reference voltage, and output a detection signal if the voltage drop exceeds the reference voltage.

In an embodiment, the bypass circuit further includes an enable input coupled to the current limiter and configured to receive an enable signal for enabling the current limiter when the main current path is disabled.

Separately or in combination, the bypass circuit further includes an enable input coupled to the comparator and configured to receive an enable signal for enabling the comparator when the main current path is disabled.

Separately or in combination, the current limiter is a current source configured to provide a substantially constant voltage across the current limiter for a current magnitude of the current source below a predetermined current value, and wherein the voltage drop across the current limiter increases as the current magnitude of the current source exceeds the predetermined current value.

Separately or in combination, the bypass circuit further includes a reference voltage source configured to provide the reference voltage, wherein the reference voltage has a predetermined voltage value. As an alternative to use of a voltage source configured to provide a predetermined voltage value, the bypass circuit may include a programmable voltage source configured to provide the reference voltage, wherein the reference voltage has a programmable value corresponding to a maximum supported current of the auxiliary current path.

Separately or in combination, the reference voltage has a value selected to indicate a short fault in the electrical load.

Separately or in combination, the reference voltage has a value selected to indicate an external excitation condition for the electrical load.

Separately or in combination, the current limiter comprises a transistor coupled in series with a resistor, and the voltage drop across the resistor increases linearly as a current drawn by the electrical load increases.

Separately or in combination, the main current path has an associated maximum main current, the reference voltage corresponds to a maximum bypass current in the current limiter, and the maximum main current exceeds the maximum bypass current by a factor of 10 or more.

According to an embodiment of an electronic system, the system comprises: an electrical load; a main current path coupled between the electrical load and a power supply line, the main current path configured to provide current to the electrical load and to be disabled during a low-power mode; and a bypass circuit. The bypass circuit comprises: a current limiter configured to provide an auxiliary current path between the power supply line and the electrical load if the main current path is disabled during the low-power mode, the auxiliary current path being configured to support a lower current than the main current path; and a comparator configured to compare a voltage drop across the current limiter to a reference voltage, and output a detection signal if the voltage drop exceeds the reference voltage.

Separately or in combination, the bypass circuit of the electronic system comprises an enable input coupled to the current limiter and configured to receive an enable signal for enabling the current limiter when the main current path is disabled.

Separately or in combination, the controller of the electronic system is configured to: receive the detection signal; send a query signal to the electrical load; receive, in response to the sent query signal, status information regarding expected current consumption of the electrical load; determine that the expected current consumption is consistent with the received detection signal; and responsive to said determination, enable the main current path.

Separately or in combination, the controller of the electronic system is configured to: disable the bypass circuit responsive to determining that the expected current consumption is not consistent with the received detection signal, thereby isolating the electrical load from the power supply line.

Separately or in combination, the electrical load is a sub-system of an electric or hybrid-electric vehicle.

According to an embodiment of a method of powering an electrical load coupled to a power supply line through a main current path, the method comprises: providing current from the power supply line to the electrical load through the main current path when the main current path is enabled and the electrical load demands power; providing an auxiliary current path between the power supply line and the electrical load via a current limiter, the auxiliary current path being configured to support a lower current than the main current path; comparing a voltage drop across the current limiter to a reference voltage; and generating a detection signal if the voltage drop exceeds the reference voltage.

Separately or in combination, the method further comprises enabling the current limiter when the main current path is disabled.

Separately or in combination, the method further comprises disabling, responsive to the detection signal, the current limiter to isolate the electrical load from the power supply line.

Separately or in combination, the method further comprises re-enabling the main current path responsive to the detection signal.

Separately or in combination, the method further comprises sending the detection signal to a controller of an electronic system for further processing.

As used herein, the terms "having," "containing," "including," "comprising," and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A bypass circuit, comprising:
a current limiter configured to provide an auxiliary current path between a power supply line and an electrical load if a main current path between the electrical load and the power supply line is disabled during a low-power mode, the auxiliary current path being configured to support a lower current than the main current path; and
a comparator configured to compare a voltage drop across the current limiter to a reference voltage, and output a detection signal if the voltage drop exceeds the reference voltage.

2. The bypass circuit of claim 1, further comprising:
an enable input coupled to the current limiter and configured to receive an enable signal for enabling the current limiter when the main current path is disabled.

3. The bypass circuit of claim 2, wherein the enable input is further coupled to the comparator and the comparator is configured to be enabled by the enable signal.

4. The bypass circuit of claim 1, wherein the current limiter is a current source configured to provide a substantially constant voltage across the current limiter for a current magnitude of the current source below a predetermined current value, and wherein the voltage drop across the current limiter increases when the current magnitude of the current source exceeds the predetermined current value.

5. The bypass circuit of claim 1, further comprising:
a reference voltage source configured to provide the reference voltage, wherein the reference voltage has a predetermined voltage value.

6. The bypass circuit of claim 1, further comprising:
a programmable voltage source configured to provide the reference voltage, wherein the reference voltage has a programmable voltage value corresponding to a maximum supported current of the auxiliary current path.

7. The bypass circuit of claim 1, wherein the reference voltage has a value selected to indicate a short fault in the electrical load.

8. The bypass circuit of claim 1, wherein the reference voltage has a value selected to indicate an external excitation condition for the electrical load.

9. The bypass circuit of claim 1, wherein the current limiter comprises a transistor coupled in series with a resistor, and wherein the voltage drop across the resistor increases linearly as a current drawn by the electrical load increases.

10. The bypass circuit of claim 1, wherein the main current path has an associated maximum main current, the reference voltage corresponds to a maximum bypass current in the current limiter, and the maximum main current exceeds the maximum bypass current by a factor of 10 or more.

11. An electronic system, comprising:
an electrical load;
a main current path coupled between the electrical load and a power supply line, the main current path configured to provide current to the electrical load and to be disabled during a low-power mode; and
a bypass circuit comprising:
a current limiter configured to provide an auxiliary current path between the power supply line and the electrical load if the main current path is disabled during the low-power mode, the auxiliary current path being configured to support a lower current than the main current path; and
a comparator configured to compare a voltage drop across the current limiter to a reference voltage, and output a detection signal if the voltage drop exceeds the reference voltage.

12. The electronic system of claim 11, wherein the bypass circuit further comprises:
an enable input coupled to the current limiter and configured to receive an enable signal for enabling the current limiter when the main current path is disabled.

13. The electronic system of claim 11, further comprising a controller configured to:
receive the detection signal;
send a query signal to the electrical load;

receive, in response to the sent query signal, status information regarding expected current consumption of the electrical load;

determine that the expected current consumption is consistent with the received detection signal; and responsive to said determination, enable the main current path.

14. The electronic system of claim 13, wherein the controller is further configured to disable the bypass circuit responsive to determining that the expected current consumption is not consistent with the received detection signal, thereby isolating the electrical load from the power supply line.

15. The electronic system of claim 11, wherein the electrical load is a sub-system of an electric or hybrid-electric vehicle.

16. A method of powering an electrical load coupled to a power supply line through a main current path, the method comprising:

providing current from the power supply line to the electrical load through the main current path when the main current path is enabled and the electrical load demands power;

providing an auxiliary current path between the power supply line and the electrical load via a current limiter, the auxiliary current path being configured to support a lower current than the main current path;

comparing a voltage drop across the current limiter to a reference voltage; and generating a detection signal if the voltage drop exceeds the reference voltage.

17. The method of claim 16, further comprising enabling the current limiter when the main current path is disabled.

18. The method of claim 16, further comprising, responsive to the detection signal, disabling the current limiter to isolate the electrical load from the power supply line.

19. The method of claim 16, further comprising, responsive to the detection signal, re-enabling the main current path.

20. The method of claim 16, further comprising sending the detection signal to a controller of an electronic system for further processing.

* * * * *